US009306385B2

(12) United States Patent
Gottschalk et al.

(10) Patent No.: US 9,306,385 B2
(45) Date of Patent: Apr. 5, 2016

(54) SURGE ARRESTER

(71) Applicant: SIEMENS AKTIENGESELLSCHAFT, Munich (DE)

(72) Inventors: Ingo Gottschalk, Berlin (DE); Erhard Pippert, Dallgow-Doeberritz Ot Seeburg (DE); Dirk Springborn, Berlin (DE); Markus Sulitze, Falkensee (DE)

(73) Assignee: Siemens Aktiengesellschaft, Munich (DE)

( * ) Notice: Subject to any disclaimer, the term of this patent is extended or adjusted under 35 U.S.C. 154(b) by 101 days.

(21) Appl. No.: 14/363,818

(22) PCT Filed: Nov. 9, 2012

(86) PCT No.: PCT/EP2012/072214
§ 371 (c)(1),
(2) Date: Jun. 9, 2014

(87) PCT Pub. No.: WO2013/083347
PCT Pub. Date: Jun. 13, 2013

(65) Prior Publication Data
US 2014/0368962 A1 Dec. 18, 2014

(30) Foreign Application Priority Data
Dec. 9, 2011 (DE) .......................... 10 2011 088 072

(51) Int. Cl.
*H01C 7/12* (2006.01)
*H02H 9/00* (2006.01)
*H02H 1/04* (2006.01)

(52) U.S. Cl.
CPC ................ *H02H 9/001* (2013.01); *H01C 7/12* (2013.01); *H02H 1/043* (2013.01)

(58) Field of Classification Search
USPC ........................................... 361/118
See application file for complete search history.

(56) References Cited

U.S. PATENT DOCUMENTS

| 2,883,574 | A | * | 4/1959 | Pittman | ..................... | H01T 1/10 |
| | | | | | | 313/231.21 |
| 3,111,606 | A | * | 11/1963 | Schuitz | ..................... | H01T 1/14 |
| | | | | | | 315/36 |
| 3,534,989 | A | * | 10/1970 | Yonkers | ..................... | F16B 3/06 |
| | | | | | | 174/176 |
| 4,930,039 | A | | 5/1990 | Woodworth | | |
| 5,113,306 | A | | 5/1992 | Veverka | | |
| 5,363,266 | A | * | 11/1994 | Wiseman | .................. | H01T 1/15 |
| | | | | | | 361/117 |

(Continued)

FOREIGN PATENT DOCUMENTS

| DE | 69023534 T2 | 5/1996 |
| DE | 19940939 C1 | 7/2001 |
| DE | 202005008111 U1 | 8/2005 |
| DE | 102005024206 A1 | 12/2006 |

(Continued)

*Primary Examiner* — Ronald W Leja
(74) *Attorney, Agent, or Firm* — Laurence Greenberg; Werner Stemer; Ralph Locher

(57) ABSTRACT

A surge arrester has a tube-shaped housing, an end fitting connected to an end of the housing, a varistor block arranged in the housing and a supporting element arranged in the region of the end fitting. The supporting element has a supporting ring which is in contact with the housing and which includes a cone and a clamping ring with a counter-cone that corresponds to the cone. The cone is braced to the counter-cone in such a manner that the supporting ring is pressed to the housing in a non-displaceable manner. The supporting element can thus also be used after the installation of the varistor block and also be removed.

6 Claims, 2 Drawing Sheets

(56) References Cited

U.S. PATENT DOCUMENTS

| | | |
|---|---|---|
| 6,678,139 B1 | 1/2004 | Greuter et al. |
| 6,777,614 B1 | 8/2004 | Suenwoldt |
| 8,446,703 B2 | 5/2013 | Klaube |

FOREIGN PATENT DOCUMENTS

| | | |
|---|---|---|
| DE | 102009007067 A1 | 8/2010 |
| RU | 2235398 C2 | 8/2004 |
| WO | 2006125753 A1 | 11/2006 |

* cited by examiner

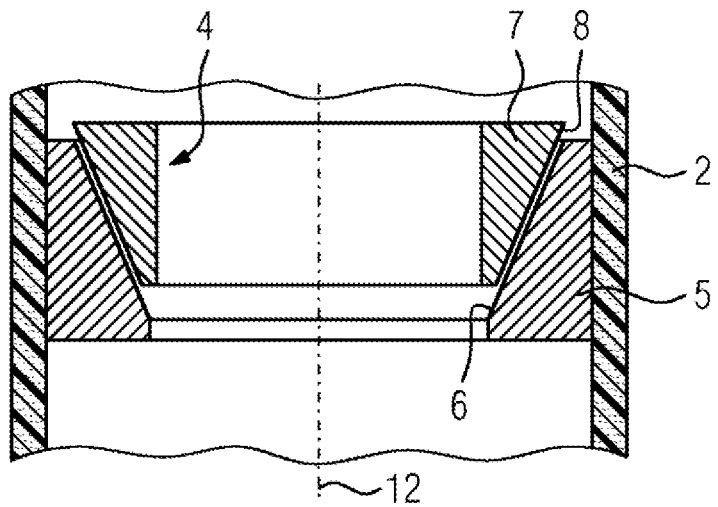
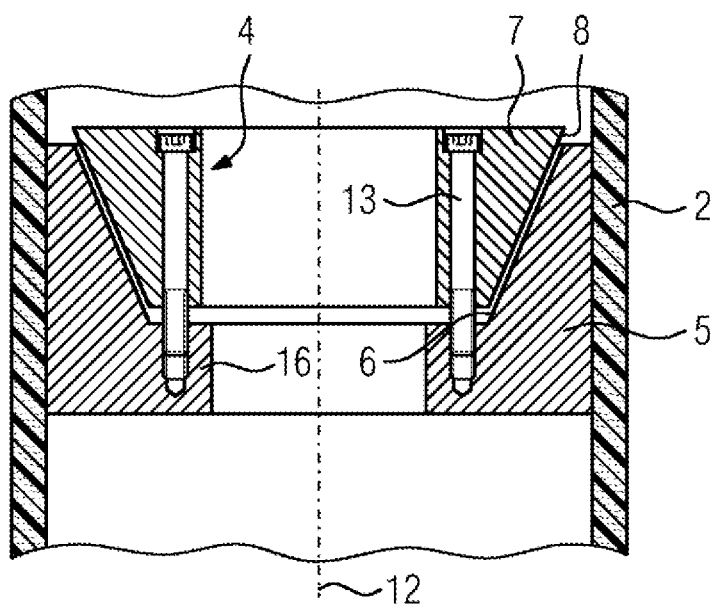

SURGE ARRESTER

BACKGROUND OF THE INVENTION

Field of the Invention

The invention relates to a surge arrester comprising a tubular housing, an end fitting, which is connected to one end of the housing, a varistor block which is arranged in the housing, and a supporting element arranged in the region of the end fitting.

Surge arresters are protection systems for high-voltage installations, for example, such as transmission lines or switchgear assemblies which, in the event of the occurrence of surge voltages owing to lightning strike or malfunctions of other subsystems, dissipate these surge voltages towards ground and thus protect other components of the high-voltage installation.

Such a surge arrester comprises one or more cylindrical varistor blocks, which are each constructed from a column of individual likewise cylindrical varistor elements. Varistor elements are characterized by a voltage-dependent resistance. At low voltages, said varistor elements act as insulators. Above a certain threshold voltage, which is dependent on the material, said varistor elements have good conductivity. Often, varistor elements are produced from metal oxides such as zinc oxide. The varistor block is limited at both ends by fittings, which produce the electrical contact to the high-voltage installation and to ground. In order to ensure good electrical contact even under mechanical loading, the varistor block needs to be held together under pressure. This can take place by virtue of tension elements, for example cables or bars, preferably consisting of glass fiber-reinforced plastic, being clamped in in the fittings under tension. The tension elements in this case surround the varistor column and thus form a cage around it. The varistor block therefore comprises the varistor column, the fittings and the tension elements.

In the case of use in high-voltage installations having voltages of several hundred kilovolts, these surge arresters can have dimensions of greater than one meter. In order to increase the mechanical stability, a tubular housing, for example consisting of a composite material such as glass fiber-reinforced plastic, is fitted in such a surge arrester between end fittings. Since the varistor column, owing to the required isolating clearances, has a smaller diameter than the inner diameter of the housing, the varistor block in this case contains intermediate plates, which are introduced into the varistor column and support said varistor column against the inner side of the housing. The varistor block is thus fixed in directions transverse to the tube axis of the housing. In order to increase the bending strength of the housing, it is known to reinforce the housing in the region of the end fitting.

Thus, DE 20 2005 008 111 U1 discloses a surge arrester which has a supporting element on the inner side of the housing in the region of the end fitting. The housing is enclosed between the end fitting and the supporting element and held fixedly by adhesive bonding.

BRIEF SUMMARY OF THE INVENTION

The object of the present invention consists in specifying a surge arrester having a high bending strength in the region of the housing end which enables a replaceability of the varistor blocks, in particular with intermediate plates, without destruction.

The object is achieved by the means of the invention as claimed.

In this case, the invention is based on a surge arrester comprising a tubular housing, which has an end fitting connected to one end of the housing, a varistor block arranged in the housing and a supporting element arranged in the region of the end fitting. According to the invention, provision is made here for the supporting element to have a supporting ring resting on the housing and comprising a cone, and a clamping ring comprising an opposing cone associated with the cone. In this case, the cone is clamped with the opposing cone in such a way that the supporting ring is pressed immovably against the housing. By virtue of the provision of a releasable press-fit connection via cones of the supporting element, it is advantageously possible both to install the supporting element in the housing retrospectively, i.e. after fitting of the varistor block in the housing, and, if required, to remove it again by releasing the clamping effect without the supporting element or the housing needing to be destroyed in the process.

In an advantageous configuration of the invention, the supporting ring rests on an inner side of the housing. By virtue of the supporting ring arranged on the inner side, the housing is prevented from bending inwards under bending loading and thereby a particularly high bending strength of the housing is achieved.

In a further advantageous configuration of the invention, the supporting ring has a second cone with an incline which is opposite that of the first cone. In addition, the supporting element has a second clamping ring comprising a second opposing cone, which is associated with the second cone. This provides a particularly advantageous distribution of the press forces of the supporting ring on the housing.

In a further configuration according to the invention, the supporting ring and the first clamping ring and possibly the second clamping ring are arranged coaxially with respect to a tube axis of the housing and are movable towards one another along the tube axis in order to produce or release the clamping effect. This enables easy positioning of the supporting element in the housing and in addition simple clamping and releasing of the supporting element.

Advantageously, provision can also be made for either the supporting ring and the first clamping ring or the first and second clamping rings to be connected to one another via adjustment means and for the movement required in order to produce or release the clamping effect to be adjustable by virtue of the adjustment means. The adjustment means firstly enable particularly simple clamping and release of the supporting element and secondly secure fixing of the supporting element in the clamped position.

The invention will be explained in more detail below with reference to the drawings, in which:

BRIEF DESCRIPTION OF THE SEVERAL VIEWS OF THE DRAWING

FIG. 3 shows an alternative embodiment of a supporting element in a half-sectional illustration, FIG. 4 shows a further alternative embodiment of a supporting element in a half-sectional illustration.

Mutually corresponding parts have been provided with the same reference symbols in all figures.

DESCRIPTION OF THE INVENTION

Figure 1:
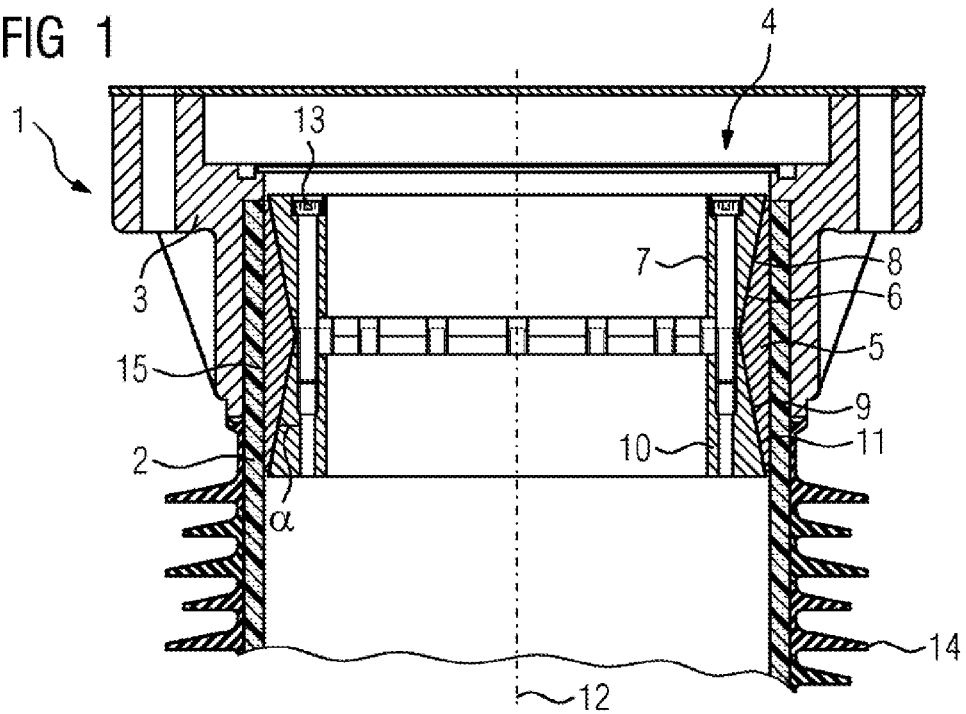
FIG. 1 shows a top end of a surge arrester according to the invention comprising a supporting element in a half-sectional illustration.

FIG. 1 shows the top region of a surge arrester 1. A tubular housing 2 is fixedly connected to an end fitting 3. The connection can be performed, for example, by means of compressive adhesive bonding. In this case, the housing 2 consists of an electrically nonconductive, mechanically stable material, usually a composite material, for example a glass fiber-reinforced plastic. A sheath with shields 14 consisting of silicone, for example, is applied to the outer side of the housing 2 in order to increase the leakage path and in order to improve the weathering resistance. The end fitting 3 usually consists of an electrically conductive material, for example aluminum or steel. Such an end fitting 3 is generally located at both ends of the housing 2, but in this case only the end fitting 3 at the top end of the housing 2 is shown. In the ready-fitted state, the end fitting 3 is electrically connected to the respective end of a varistor block (not illustrated here). For fitting, the housing 2 is erected with the end fittings 3 fastened at the housing ends, and the varistor block is introduced into the housing 2 from above. Then, a supporting element 4 is introduced into the housing 2 and fixed in the housing 2 in the region of the upper end fitting 3. In this case, the supporting element 4 protrudes beyond the region of the end fitting 3 into the housing 2. In the exemplary embodiment shown in FIG. 1, the supporting element 4 comprises a supporting ring 5, a first clamping ring 7 and a second clamping ring 10. The first clamping ring 7 has bores, and the second clamping ring 10 has bores with an internal thread. Adjustment means 13, which are illustrated here as screws, are introduced through the bores in the first clamping ring 7 and into the internal thread of the second clamping ring 10.

The supporting ring 5 has a cylindrical, straight, outer lateral surface 15 and a first cone 6 and a second cone 9 on the inner lateral surface. The outer lateral surface 15 of the supporting ring 5 rests on the inner side of the housing 2. The second cone 9 has an incline with respect to the tube axis 12 which is opposite that of the first cone 6, but the same cone angle $\alpha$.

The first clamping ring 10 has a straight, inner lateral surface and a first opposing cone 8 on its outer lateral surface. The cone angle of the first opposing cone 8 corresponds to the cone angle $\alpha$ of the first cone 6, but with an opposite incline. The diameter of the first clamping ring 7 is dimensioned such that the first clamping ring 7 can be inserted coaxially at least partially into the supporting ring 5. The second clamping ring 10 corresponds in terms of its outer shape and its dimensions to the first clamping ring 7, but is arranged rotated through 180° about an axis transverse to the tube axis 12.

The first clamping ring 7 is arranged in the supporting ring 5 in such a way that the first opposing cone 8 at least partially rests on the first cone 6. The first cone 6 and the first opposing cone 8 are thus associated with one another. The second clamping ring 10 is arranged in the supporting ring 5 in such a way that the second opposing cone 11 rests at least partially on the second cone 9. The second cone 9 and the second opposing cone 11 are thus associated with one another.

The first and second clamping rings 7, 10 are connected to adjustment means 13. The adjustment means 13 engage through the bores in the first clamping ring 7 into the internal thread of the second clamping ring 10. The first and second clamping rings 7, 10 in this case have a spacing in the axial direction of the tube axis 12. If the adjustment means 13 are tightened, this spacing is reduced. The first and second opposing cones 8, 11 in this case slide along the respectively associated cone 6, 9 and in the process press the supporting ring 5 outwards against the housing 2.

Figure 2:
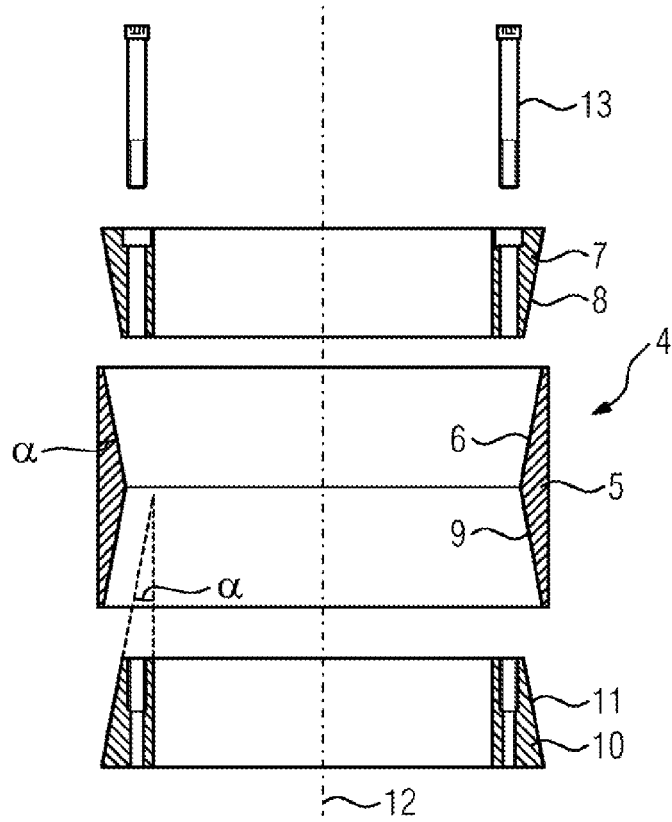
FIG. 2 shows the individual parts of the supporting element shown in FIG. 1 in a half-sectional illustration.

FIG. 2 shows the individual parts of the supporting element 4 shown in FIG. 1 in the unfitted state. For fitting, the first clamping ring 7 and the second clamping ring 10 are inserted into the supporting ring 5 from opposite sides. The first and second clamping rings 7, 10 are connected loosely to one another using the adjustment means 13. The thus prefitted supporting element 4 is then introduced into the housing 2 from one end and positioned in the region of the end fitting 3. When the supporting element 4 is in the correct position, the adjustment means 13 are tightened and thus the clamping rings 7, 10 are clamped with the supporting ring 5 and at the same time the supporting ring 5 is pressed outwards against the inner wall of the housing 2. The supporting element 4 is thus fixed in the housing 2. If, for example after an electrical test has been performed, it is necessary to remove the varistor block, the adjustment means 13 and therefore the clamping effect are released and the supporting element 4 can be removed from the housing 2. Then, the varistor block can be removed from the housing 2 and repaired or replaced.

FIGS. 3 and 4 show further embodiments of a supporting element 4 in a housing 2. Further component parts of the surge arrester 1 are not illustrated here for reasons of clarity.

FIG. 3 shows a supporting element 4 comprising a supporting ring 5 and a first clamping ring 7. The supporting ring 5 has a first cone 6, and the first clamping ring 7 has a first opposing cone 8. The first clamping ring 7 is arranged in the supporting ring 5 in such a way that the first cone 6 and the first opposing cone 8 rest against one another. The supporting ring 5 and the first clamping ring 7 can be clamped with one another with the aid of a clamping tool (not illustrated here) by virtue of the first clamping ring 7 being pressed into the supporting ring 5. During a suitable surface treatment of the first cone 6 and the first opposing cone 8, this clamping effect is self-fixing. Release of the clamping effect is then performed using a corresponding release tool.

In FIG. 4, a ring-shaped collar 16 is formed integrally on the supporting ring 5 at the wider end of the first cone 6, in which collar bores with a thread are introduced in the direction parallel to the tube axis 12. The first clamping ring 7 has through-holes likewise parallel to the tube axis 12 which engage through the adjustment means 13 into the thread in the collar 16 of the first clamping ring 7. By tightening of the adjustment means 13, the clamping ring 7 is moved along the cone 6 and the opposing cone 8 relative to the supporting ring 5 and clamps said cones with the housing 2.

The invention claimed is:

1. A surge arrester, comprising:
   a tubular housing having an end;
   an end fitting connected to said end of said housing;
   a varistor block disposed in said housing; and
   a supporting element disposed in a region of said end fitting, said supporting element having:
      a supporting ring resting on said housing and including a first cone;
      a first clamping ring including a first opposing cone associated with said first cone;
      wherein said first cone is clamped with said first opposing cone such that said supporting ring is pressed immovably against said housing.

2. The surge arrester according to claim 1, wherein said supporting ring rests on an inner wall surface of said housing.

3. The surge arrester according to claim 1, wherein said supporting ring has a second cone formed with an incline opposite to an incline of said first cone, and said supporting element has a second clamping ring formed with a second opposing cone associated with said second cone.

4. The surge arrester according to claim 3, wherein said supporting ring, said first clamping ring, and said second clamping ring are arranged coaxially with respect to a tube axis of said housing and are movable relative to one another along said tube axis so as to selectively produce or release a clamping effect.

5. The surge arrester according to claim 1, wherein said supporting ring and said first clamping ring are arranged coaxially with respect to a tube axis of said housing and are movable relative to one another along said tube axis so as to selectively produce or release a clamping effect.

6. The surge arrester according to claim 1, which further comprises adjustment means connecting said supporting ring and said first clamping ring or said first and second clamping rings to one another, wherein a movement required in order to produce or release a clamping effect is adjustable by way of said adjustment means.

* * * * *